(12) United States Patent
Marinelli et al.

(10) Patent No.: US 10,257,267 B2
(45) Date of Patent: Apr. 9, 2019

(54) RUNNING SOFTWARE APPLICATION WITH DYNAMIC ACTION DELEGATION

(71) Applicant: INTERNATIONAL BUSINESS MACHINES CORPORATION, Armonk, NY (US)

(72) Inventors: Claudio Marinelli, Rome (IT); Luigi Pichetti, Rome (IT); Alex Donatelli, Rome (IT); Giovanni Lanfranchi, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 133 days.

(21) Appl. No.: 14/907,630

(22) PCT Filed: Jul. 7, 2014

(86) PCT No.: PCT/EP2014/064439
§ 371 (c)(1),
(2) Date: Jan. 26, 2016

(87) PCT Pub. No.: WO2015/014570
PCT Pub. Date: Feb. 5, 2015

(65) Prior Publication Data
US 2016/0164960 A1    Jun. 9, 2016

(30) Foreign Application Priority Data
Jul. 31, 2013    (GB) .................................. 1313660.1

(51) Int. Cl.
*G06F 15/16*    (2006.01)
*H04L 29/08*    (2006.01)
*G06F 9/50*    (2006.01)

(52) U.S. Cl.
CPC .......... *H04L 67/104* (2013.01); *G06F 9/5044* (2013.01); *H04L 67/32* (2013.01); *G06F 2209/509* (2013.01)

(58) Field of Classification Search
CPC ... H04L 67/10; H04L 67/2804; H04L 67/125; H04L 67/34; H04L 67/32; H04L 41/5022
(Continued)

(56) References Cited

U.S. PATENT DOCUMENTS 6,990,662 B2    1/2006    Messer et al.
7,062,527 B1    6/2006    Tyrrell, III
(Continued)

FOREIGN PATENT DOCUMENTS

CN    101350752 A    1/2009
CN    103309563 A    9/2013
(Continued)

OTHER PUBLICATIONS

Smith et al, "Android programming recipe, Revised edition, Architecture / UI / Network Edition", Imnpress Japan Corp., (cited in related published Japanese Publication No. JP 2016-528624) (with English translation of Abstract) (31 pages). (Year: 2016).*
(Continued)

*Primary Examiner* — Wing F Chan
*Assistant Examiner* — Andrew Woo
(74) *Attorney, Agent, or Firm* — Michael O'Keefe, Esq.; Kevin P. Radigan, Esq.; Heslin Rothenberg Farley & Mesiti P.C.

(57) ABSTRACT

A solution for running a software application on a computing machine is provided, which includes registering a capability of a delegation component to execute at least one action on the computing machine, each one defined by at least one characteristic thereof, receiving a request for executing the at least one action from the software applica-
(Continued)

tion by the delegation component, the request being bound to the delegation component at run-time according to the capability registration thereof, and delegating, by the delegation component, the execution of the at least one action to at least one local component of the computing machine being capable of executing at least part of the at least one action and/or to at least one remote component of at least one remote computing machine being capable of executing at least part of the at least one action according to an availability of the at least one local component.

14 Claims, 4 Drawing Sheets

(58) Field of Classification Search
USPC .................................................. 709/204, 205
See application file for complete search history.

(56) References Cited

U.S. PATENT DOCUMENTS

| | | | |
|---|---|---|---|
| 7,970,830 | B2 | 6/2011 | Staggs et al. |
| 8,355,709 | B2 | 1/2013 | Nagaraj et al. |
| 8,849,233 | B2* | 9/2014 | Hauser ............... H04M 1/72527 455/334 |
| 2003/0046396 | A1* | 3/2003 | Richter ................. G06F 9/505 709/226 |
| 2007/0073877 | A1 | 3/2007 | Boykin et al. |
| 2007/0192329 | A1* | 8/2007 | Croft ..................... G06F 3/1415 |
| 2009/0022118 | A1 | 1/2009 | Behzad et al. |
| 2009/0023452 | A1 | 1/2009 | Quigley et al. |
| 2009/0102838 | A1 | 4/2009 | Bullard et al. |
| 2010/0017368 | A1 | 1/2010 | Mao et al. |
| 2010/0131590 | A1* | 5/2010 | Coleman ............... G06F 9/5044 709/203 |
| 2012/0265884 | A1* | 10/2012 | Zhang ................... G06F 9/5044 709/226 |
| 2013/0073600 | A1 | 3/2013 | Jenkins et al. |
| 2013/0174174 | A1 | 7/2013 | Jung et al. |

FOREIGN PATENT DOCUMENTS

| | | |
|---|---|---|
| JP | H 05-274399 A | 10/1993 |
| JP | H 11212915 A | 8/1999 |
| JP | 2002-041309 A | 2/2002 |
| JP | 2002-505776 A | 2/2002 |
| JP | 2006502457 A | 1/2006 |
| JP | 2006252218 A | 9/2006 |
| JP | 2010527057 A | 8/2010 |
| JP | 2012523038 A | 9/2012 |
| JP | 2013061845 A | 4/2013 |
| JP | 2013513295 A | 4/2013 |
| JP | 2014102837 A | 6/2014 |
| WO | WO 1998/58478 A2 | 12/1998 |

OTHER PUBLICATIONS

Zhang, et al; "Towards an elastic application model for augmenting the computing capabilities of mobile devices with cloud computing," Journal Mobile Networks and Applications Archive, vol. 16, Issue 3, Jun. 2011, pp. 270-284.

Chun, et al; "Clonecloud: elastic execution between mobile device and cloud," EuroSys '11 Proceedings on the sixth conference on Computer systems, pp. 301-314.

International Search Report for PCT/EP2014/064439 dated Oct. 7, 2014.

Smith et al, "Android programming recipe, Revised edition, Architecture / UI / Network Edition", Imnpress Japan Corp., (pp. 016-039 & 047-050) (cited in related published Japanese Publication No. JP 2016-528624).

Smith et al, "Android programming recipe, Revised edition, Architecture / UI / Network Edition", Imnpress Japan Corp., (cited in related published Japanese Publication No. JP 2016-528624) (with English translation of Abstract) (31 pages).

* cited by examiner

RUNNING SOFTWARE APPLICATION WITH DYNAMIC ACTION DELEGATION

BACKGROUND

The present disclosure relates to the data processing field. More specifically, this disclosure relates to the running of software applications.

Software applications are routinely run on computing machines to perform useful tasks. Typical examples are mobile apps (or simply apps), which are software applications specifically designed to run on mobile devices (for example, smart-phones and tablets). The apps have become increasingly popular, with an explosion of their number and variety.

Particularly, the apps offer a broadening range of rich functionalities (for example, implementing location, environmental, augmented-reality services). This involves an increasing request of (hardware and/or software) resources of the mobile devices. For example, the apps may involve high power consumption; moreover, the apps may require different sensors that measure corresponding physical quantities (such as a barometer for measuring an atmospheric pressure).

However, the capabilities of the mobile devices may not keep up with the development of the apps. Therefore, some apps may not run on a specific mobile device because of either an inherent limitation, or a temporary limitation thereof. Particularly, the mobile device may not be capable of running some apps inherently when it is lacking the resources required by them (for example, because it has sensors with low sensibility level or it is an older model). A typical example of this is when an app requires a sensor that is not present on the mobile device. Moreover, the mobile device may not be capable of running some apps temporarily when the resources required by them are unavailable at the moment; a typical example is when an app requires a high power consumption and the battery level is low.

Therefore, in case of an inherent limitation of the mobile device, this would require its change with a newer and more powerful model, with corresponding costs; however, the change of the mobile device may be not feasible (for example, because of budget constraints) or inappropriate (for example, when the need of the required resources is only occasional). In the case of temporary limitation, instead, this would require waiting until the required resources return available (for example, the battery is re-charged); however, the corresponding delay may be intolerable in many practical situations (for example, when a piece of information is needed immediately).

SUMMARY

In one or more aspects, a computer-implemented method for running a software application on a computing machine is provided. The method includes: registering a capability of a delegation component to execute at least one action on the computing machine, each action being defined by at least one characteristic thereof; receiving a request for executing the at least one action from the software application by the delegation component, the request being bound to the delegation component at run-time according to the capability registration thereof; and delegating, by the delegation component, the execution of the at least one action to at least one local component of the computing machine capable of executing at least part of the at least one action and/or to at least one remote component of at least one remote computing machine capable of executing at least part of the at least one action according to an availability of the at least one local component.

In one or more additional aspects, a computer program product is provided for running a software application on a computing machine. The computer program product includes a computer-readable storage medium having program instructions embodied therewith, the program instructions being executable by a processor to cause the processor to perform a method comprising: registering a capability of a delegation component to execute at least one action on the computing machine, each action being defined by at least one characteristic thereof; receiving a request for executing the at least one action from the software application by the delegation component, the request being bound to the delegation component at run-time according to the capability registration thereof; and delegating, by the delegation component, the execution of the at least one action to at least one local component of the computing machine capable of executing at least part of the at least one action and/or to at least one remote component of at least one remote computing machine capable of executing at least part of the at least one action according to an availability of the at least one local component.

In one or more further aspects, a system for running a software application on a computing machine is provided. The system includes a memory, and a processor communicatively coupled to the memory, wherein the system performs a method comprising: registering a capability of a delegation component to execute at least one action on the computing machine, each action being defined by at least one characteristic thereof; receiving a request for executing the at least one action from the software application by the delegation component, the request being bound to the delegation component at run-time according to the capability registration thereof; and delegating, by the delegation component, the execution of the at least one action to at least one local component of the computing machine capable of executing at least part of the at least one action and/or to at least one remote component of at least one remote computing machine capable of executing at least in part the at least one action according to an availability of the at least one local component.

BRIEF DESCRIPTION OF THE DRAWINGS

The solution of the present disclosure, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Certain aspects of the present invention are initially summarized below in order to provide a basic understanding thereof; however, the sole purpose of this summary is of introducing some concepts of the disclosure in a simplified form as a prelude to its following more detailed description, and it is not to be interpreted as an identification of its key elements nor as a delineation of its scope.

In general terms, the present disclosure is based on the idea of delegating the execution of actions dynamically.

Particularly, one or more aspects of the present disclosure are set out in the independent and dependent claims, with the wording of all the claims being herein incorporated verbatim by reference (with any advantageous feature provided with reference to a specific aspect that applies mutatis mutandis to every other aspect).

More specifically, in one or more aspects, a method is provided for running a software application on a computing machine, wherein the execution of an action is delegated by a delegation component to at least one local component and/or at least one remote component (being capable of executing at least part of the action) according to an availability of the at least one local component, in response to a corresponding request that is bound to the delegation component at run-time.

A further aspect provides a corresponding computer program (and a corresponding computer program product).

A further aspect provides a corresponding system.

Figure 1:
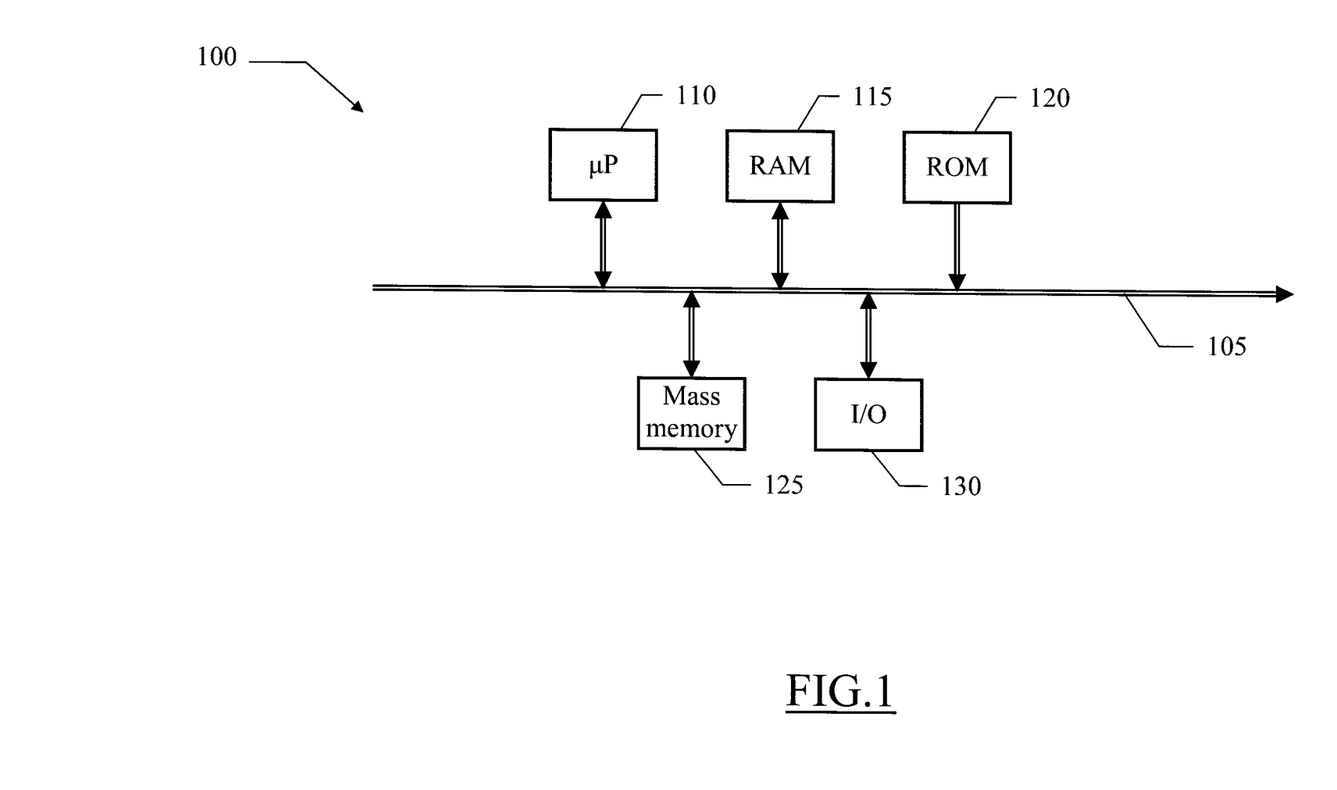
FIG. 1 shows a block-diagram of a computing machine wherein a solution according to one or more aspects of the present invention may be applied.

With reference in particular to FIG. 1, a block-diagram is shown of a computing machine 100 wherein a solution according to an embodiment of the present disclosure may be applied.

By way of example, computing machine 100 is a mobile device, for example, a smart-phone or a tablet. The mobile device 100 comprises several units that are connected in parallel to a bus structure 105. In detail, a microprocessor (µP) 110, or more, controls operation of the mobile device 100; a RAM 115 is used as a working memory by microprocessor 110, and a ROM 120 stores basic code for a bootstrap of the mobile device 100. The mobile device 100 also includes a mass-memory 125, which comprises an internal flash memory and a possible external flash memory card (such as of the SD type). Moreover, the mobile device 100 has input/output (I/O) units 130, for example, a mobile telephone transceiver (TX/RX), a Wireless Network Interface Card (WNIC) of the Wi-Fi type, a touch-screen, command buttons, a loudspeaker and a microphone.

Figure 2:
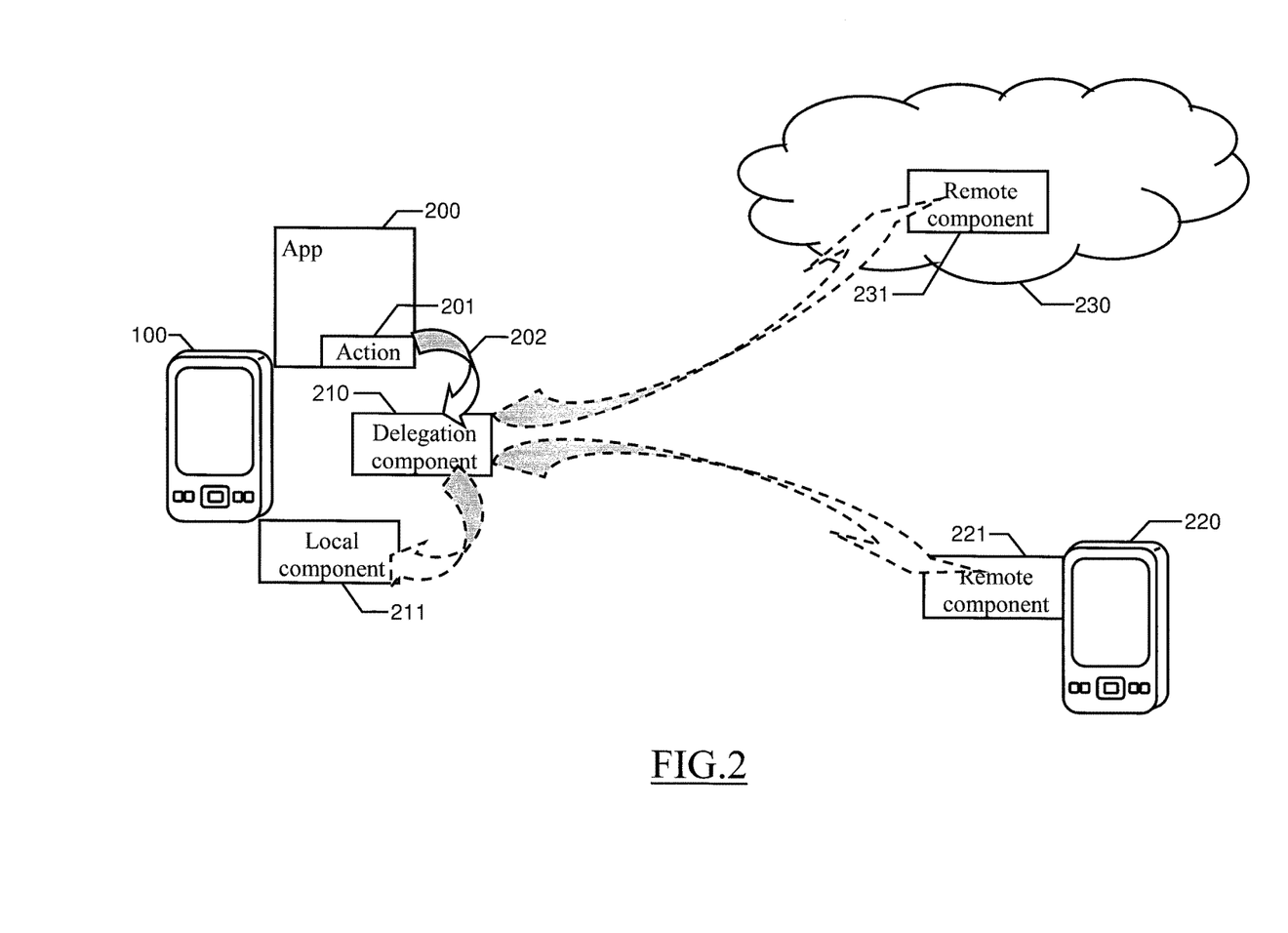
FIG. 2 shows a pictorial representation of an exemplary application of a solution according to one or more aspects of the present invention.

With reference now to FIG. 2, a pictorial representation is shown of an exemplary application of a solution according to an embodiment of the present disclosure.

A generic mobile device 100 runs one or more (mobile) apps 200. Each app requires the execution of one or more actions 201 (for example, measuring a physical quantity by means of a corresponding sensor). Each action is defined by means of one or more characteristics thereof (for example, its name) for a late, or dynamic, binding of the action to an actual component that will execute it at run-time. In this way, the app may use functionalities of other apps without knowing exactly which other apps will provide them (with the actions that are resolved into the components that are best suited to execute them only when it is necessary).

In a solution according to an embodiment of the present disclosure, the mobile device also comprises a delegation component 210; the delegation component registers itself as capable of executing a set of one or more actions (defined by corresponding characteristics), including the above-mentioned action of the app.

Therefore, when the app 200 needs to execute the action 201, a corresponding request 202 is received by the delegation component 210 (which is bound thereto at run-time according to its registration).

The delegation component 210 delegates the execution of the action 201 to a local component 211, or more, of the mobile device 100 (capable of executing the action, or at least part thereof) and/or to a remote component 221, 231, or more, of a remote computing machine, or more (capable of executing the action, or at least part thereof), for example, on another mobile device 220 or a cloud environment 230, respectively. The decision about how to delegate the execution of the action 201 is based on an availability of the local component 211. For example, the action 201 is executed locally when the mobile device 100 has the corresponding sensor; conversely, the action is executed remotely entirely on another mobile device 220 or partially on another mobile device 220 (which shares a corresponding sensor) and on the cloud environment 230 (which exploits the value being measured by the shared sensor).

In this way, the app 200 (or more generally any software application) may run even when the mobile device 100 (or more generally any computing machine) would not be able to support it (because of either an inherent limitation or a temporary limitation thereof); particularly, this is possible when the resources required by the software application 200 are either lacking on the computing machine (for example, because it has sensors with low sensibility level or it is an older model) or unavailable at the moment (for example, because its battery level is low).

Therefore, in case of inherent limitation of the computing machine, it is possible to avoid changing it (with newer and more powerful models), with a corresponding cost saving; the software applications may then run (on the available computing machine) even when its change is not feasible or is inappropriate. In the case of temporary limitation of the computing machine, instead, the software application may run when it is actually necessary (without the need of waiting until the required resources return available).

Figure 3:
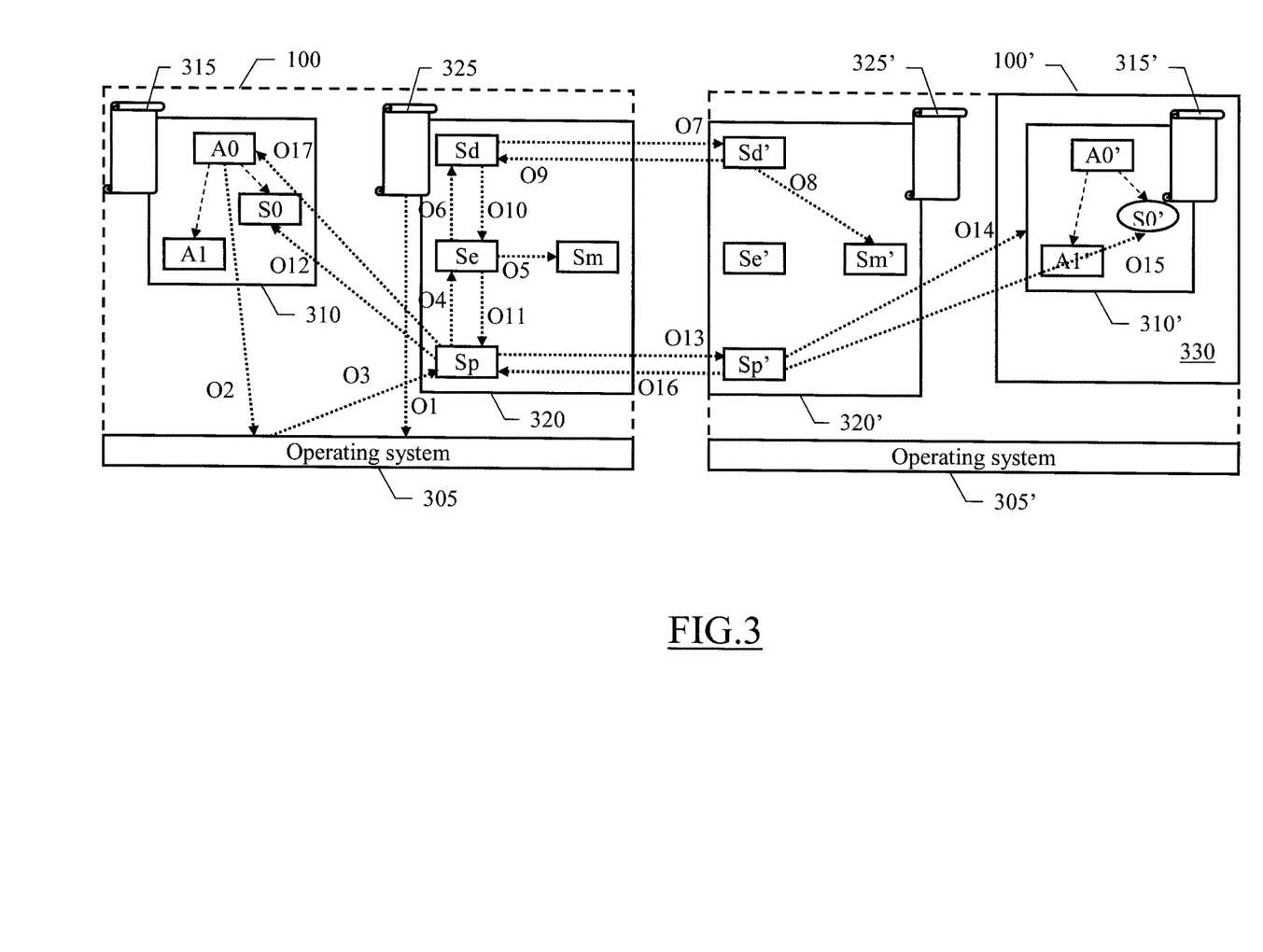
FIG. 3 shows a collaboration diagram representing the roles of the main software units that may be used to implement an exemplary scenario of an application embodiment according to one or more aspects of the present invention.

A more detailed example is provided with reference to FIG. 3, wherein a collaboration diagram is shown representing the roles of the main software units that may be used to implement an exemplary scenario of application of an embodiment of the present disclosure.

Particularly, the software units are typically stored in the mass memory and loaded (at least partially) into the working memory of the mobile device when the programs are running. The programs are initially installed onto the mass memory, for example, from removable storage devices or from a network (such as the Internet). In this respect, each software unit may represent a module, segment or portion of code, which comprises one or more executable instructions for implementing the specified logical function. Particularly, the figure describes both the static structure of the software units and their dynamic behavior (by means of a series of exchanged messages, each one representing a corresponding operation, denoted with sequence numbers preceded by the symbol "O").

The mobile device 100 has a (mobile) operating system 305 directly running on its hardware, which defines a software platform on top of which any other program may run (for example, Android® by Google® Inc.); the operating system 305 has a user interface primarily designed for touch-screens, which is based on direct manipulation using gestures (i.e., inputs corresponding to real actions) with possible tactile feedbacks.

Different apps may be installed on the mobile device 100; each app (for example, written in the Java programming language) is intended to run in a sandbox (i.e., an isolated environment providing access to tightly controlled resources of the mobile device 100). The app comprises one or more components, with each component that may be activated individually to perform a specific task. Each component may be an activity (displaying a single screen of a user interface), a service (running in the background), a broadcast receiver (responding to broadcasted announcements) or a content provider (managing data storage). The app also comprises a manifest file. The manifest file declares the components of the app that are visible to the operating system 305; each component may be declared with one or more intent filters indicating its capabilities (i.e., each one indicating a task that the component is capable of performing). The manifest file declares possible features, each one indicating a (hardware and/or software) resource that is used by the app (for example, operating system level, VoIP, sensors, Wi-Fi, bluetooth, camera, GPS, USB); each feature may have an attribute indicating whether the feature is required by the app that cannot run without it or the feature is simply preferred by the app that may even run without it. The features are informational only, with the operating system 305 that does not verify their availability on the mobile device 100 when the app is installed (but they may be used by other applications, for example, for preventing the downloading of the app on mobile devices that would not be able to run it). The manifest file also declares any permission to access resources external to the sandbox of the app (to be authorized by a user of the mobile device 100 at its installation).

Each content provider is activated by submitting a corresponding request to a content resolver of the operating system 305. Each activity, service and broadcast receiver is activated by submitting a corresponding message (called intent) to the operating system 305. The intent may be either explicit or implicit. An explicit intent indicates a specific component to be activated (in the same app or in a different app), which is then statically (or early) bound thereto. An implicit intent, instead, simply indicates an action to be executed (for the activities and the services) or that is announced (for the broadcast receivers), so that the actual component that executes or receives, respectively, the action is dynamically (or late) bound thereto at run-time. The action is defined in the (implicit) intent at an abstract level by means of one or more characteristics thereof. Particularly, the intent defines a type of the action (by means of a corresponding constant); the intent may also define the data to be acted on (for example, its location and type), one or more categories of the component that should be activated, extra information to be delivered to the activated component, and flags instructing how to manage the activated component. The operating system 305 resolves each intent at run-time by finding a component that is capable of executing or receiving its action. For this purpose, the operating system 305 compares the action defined in the intent with the intent filters of all the installed apps. Each intent filter likewise indicates an action that the component is capable of executing (for the activities and the services) or receiving (for the broadcast receivers) at an abstract level; particularly, the intent filter defines one or more action types, and it may also define the data to be acted on and one or more categories thereof. Each intent filter is tested against the intent; the intent filter is deemed to pass the test when the action type of the intent matches one of its action types, every category of the intent matches one of its categories and the data of the intent matches its one. The component whose intent filter passed the test is then activated by the operating system 305 (whereas an exception is raised when no component has been found); when multiple components passed the test, one of them is selected either manually by the user or automatically (for example, according to priorities or by default).

In the example at issue, a very simple app 310 is installed on the mobile device 100. The app 310 comprises an activity A0 that exploits a service S0 (either included in the app 310 or not) and another activity A1 (being implicitly bound at-run time as indicated by corresponding arrows and dashed lines). The app 310 has a manifest file 315 that defines, inter alias, the activities A0, A1 and possibly the service S0 with their intent filters; particularly, the activity A0 has two intent filters IFA0a,IFA0b, and the service S0 (if present) has an intent filter IFS0 (with the indication of any corresponding required features). For example, the app 310 implements a short-term weather forecast; the activity A0 provides a start screen of the app 310 (with two different layouts corresponding to its intent filters IFA0a and IFA0b), the service S0 measures a local atmospheric pressure and determines the weather forecast according to its change over time (with its intent filter IFS0 indicating the corresponding action and the need of a barometer), and the activity A1 displays the weather forecast.

In the solution according to an embodiment of the present disclosure, a delegation app 320 is also installed on the mobile device 100. The delegation app 320 comprises a proxy service Sp, which registers itself as capable of executing the action of one or more services (of the apps installed on the mobile device 100); particularly, in the example at issue the proxy service Sp registers itself as capable of executing the same action of the service S0. The proxy service Sp exploits an evaluation service Se, which evaluates the delegation of each action requested to the proxy service Sp. The evaluation service Se exploits a measuring service Sm, which measures one or more metrics of the mobile device 100 (for example, battery level, available wire-less connections, corresponding band-width). The evaluation service Se also exploits a discovery service Sd, which discovers other computing machines available to execute the actions requested to the proxy service Sp (for example, other mobile devices, hereinafter referred to as remote mobile devices). The discovery service Sd also responds to corresponding requests from other mobile devices; for this purpose, the discovery service Sd as well exploits the measurement service Sm. The delegation app 320 has a manifest file 325 that defines, inter alias, the services Sp, Se, Sm, Sd with their intent filters; particularly, the proxy service Se has the same intent filter IFS0 as the service S0, the evaluation service Se has an intent filter IFe for evaluating the delegation of an action, the measurement service Sm has an intent filter IFm for measuring the metrics of the mobile device 100, and the discovery service Sd has an intent filter IFda for discovering the availability of the remote mobile devices and an intent filter IFdr for responding to corresponding requests.

The intent filters of the app 310 and of the delegation app 320 (as indicated in their manifest files 315 and 325, respectively) are registered with the operating system 305. This operation is performed when each app 310,320 is installed on the mobile device 100 and whenever its manifest file 315,325 is updated; with reference in particular to the delegation app 320, the manifest file 325 may be updated by downloading a new version thereof to keep up with the technological development of the mobile devices or by adding/removing intent filters for services of installed/deleted apps (O1.Register).

Whenever the app 310 runs, its activity A0 submits an intent for the action of the service S0 (referred to as app intent and app action, respectively) to the operating system 305 as soon as it has to be activated. Particularly, in the example at issue the app intent indicates the action of monitoring the local atmospheric pressure and determining the weather forecast according to its change over time, and the need of a barometer for this purpose (O2.Intent). The operating system 305 tries resolving the app intent by finding a component that is capable of executing the app action. In this situation, the operating system 305 always finds that the proxy service Sp passes the test against the app intent (since it is registered with an intent filter for the same app action). Moreover, the operating system 305 may also find a local service on the mobile device 100 that passes the test against the app intent (i.e., when the service S0 is present on the mobile device 100 in the example at issue); however, the intent filter of the proxy service Sp is registered as default, so as to cause the operating system 305 to select it in any case. Therefore, the app intent is always bound dynamically to the proxy service Sp, so that it is activated for executing the action indicated therein (O3.Bind).

In response thereto, the proxy service Sp submits an explicit intent for the evaluation of the app intent by the evaluation service Se, which is directly bound thereto by the operating system 305 (O4.Evaluate). The evaluation service Se decides whether the app action has to be executed locally or remotely according to a set of one or more policies (for example, read from a corresponding content provider not shown in the figure). For this purpose, different policies may be implemented. First of all, the evaluation service Se determines whether a local service that is capable of executing the app action is present on the mobile device 100; for this purpose, the evaluation service Se verifies whether any local service exists that passes the test against the app intent (i.e., the service S0 in the example at issue) and whether the mobile device 100 has all the features required by the app intent (i.e., the barometer in the example at issue). If no local service with the required features is found, the execution of the app action is always delegated remotely. Conversely, the decision of delegating the execution of the app action locally or remotely may be based on one or more selected metrics of the mobile device 100. In this case, the evaluation service Se submits an explicit intent for the measurement of the metrics by the measurement service Sm, which is directly bound thereto by the operating system 305. The metrics to be measured may be defined at the level of the measurement service Sm (for example, read from a corresponding content provider not shown in the figure), they may be passed by the evaluation service Se in the corresponding intent or they may be hard-coded. The measurement service Se measures the metrics and returns an indication thereof to the evaluation service Se (O5.Measure). The evaluation service Se may then decide to delegate the execution of the app action locally or remotely according to different policies. For example, the execution of the app action is delegated remotely when the battery level is below a threshold, whereas it is delegated locally when the bandwidth of any available wire-less connection is below a threshold.

When the evaluation service Se decides to delegate the execution of the app action remotely, the evaluation service Se submits an explicit intent for discovering the corresponding availability of any remote mobile devices to the discovery service Sd, which is directly bound thereto by the operating system 305 (O6.Discover). In response thereto, the discovery service Sd broadcasts an intent for requesting the availability to execute the app action to any remote mobile device, only one shown in the figure, in proximity of the mobile device (for example, connected to the same Wi-Fi spot or to the same telecommunication cell). Each remote mobile device, differentiated with a prime notation 100', has an operating system 305' and a similar delegation app (denoted with 320'), which likewise comprises a proxy service (denoted with Sp'), an evaluation service (denoted with Se'), a measuring service (denoted with Sm') and a discovery service (denoted with Sd'); the delegation app 320' has a similar manifest file 325' (with different intent filters for the actions of its apps, not shown in the figure). The intent for requesting the availability to execute the app action is explicit for the discovery service Sd', so that it is directly bound thereto by the operating system 305' (O7.Request).

The discovery service Sd' decides whether the remote mobile device 100' is available to execute the app action according to a set of one or more policies (for example, read from a corresponding content provider not shown in the figure). For this purpose, different policies may be implemented. First of all, the discovery service Sd' determines whether the remote mobile device 100' has all the features required by the app intent (i.e., the barometer in the example at issue). If the required features are not found, the remote mobile device 100' is always made not available. Conversely, the decision about the availability of the remote mobile device 100' may be based on one or more selected metrics thereof. In this case, the discovery service Sd' submits an explicit intent for the measurement of the metrics by the measurement service Sm', which is directly bound thereto by the operating system 305' (as above, with the metrics defined at the level of the discovery service Sd', passed by the evaluation service Se' in the corresponding intent or hard-coded). The measurement service Sm' measures the metrics and returns an indication thereof to the discovery service Sd' (O8.Measure). The discovery service Sd' may then decide to make the remote mobile device 100' available or not according to different policies. For example, the remote mobile device 100' may be made available only to other pre-authorized mobile devices (for example, of a same organization). Moreover, the remote mobile device 100' may be made available to share the features required by the app intent only (but not to execute the app action) when the battery level is above a first threshold, whereas the remote mobile device 100' may be made available to execute the app action when the battery level is above a second threshold (higher than the first threshold). The discovery service Sd' returns a response to the discovery service Sd of the mobile device 100 indicating the availability of the remote mobile device 100' (i.e., complete, partial or none), together with possible characteristics thereof, for example, its processing power, working memory size, sensor characteristics (O9.Response).

Assuming that the discovery service Sd has found one or more remote mobile devices 100' that are available to execute (completely or partially) the app action, it selects one of them according to a set of one or more policies (for example, read from a corresponding content provider not shown in the figure). For this purpose, different policies may be implemented. First of all, the discovery service Sd gives precedence to the remote mobile devices 100' that are available to execute the app action completely; if multiple remote mobile devices 100' remain, the selection may be based on characteristics of the remote mobile device 100' (as returned in the corresponding response) and/or on a corresponding connection (for example, type and band-width). The discovery service Sd then returns an indication of the remote mobile device 100' that is available to execute the app action completely or only partially (if any) to the evaluation service S2 (O10.Availability).

In any case, the evaluation service Se returns the result of the evaluation of the app intent to the proxy service Sp; this result indicates whether the app action has to be executed locally or remotely, and in the latter case it also indicates the remote mobile device 100' that is available to do it completely or partially (action O11.Decision).

When the execution of the app action has to be executed locally, the proxy service Sp submits an explicit intent for the execution of the app action by the service S0, which is directly bound thereto by the operating system 305. The service S0 is then activated to execute the app action (i.e., measuring the local atmospheric pressure and determining the weather forecast according to its change over time in the example at issue); the service S0 returns any result of the execution of the app action (i.e., the local atmospheric pressure and the weather forecast in the example at issue) to the proxy service Sp (O12.Local).

Conversely, assuming that a remote mobile device 100' available to execute the app action completely has been found, the proxy service Sp transmits an intent for causing the execution of the app action to it; this intent also comprises an image of the app 310 (or at least of the service S0). The intent for causing the execution of the app action is explicit for the proxy service Sp', so that it is directly bound thereto by the operating system 305' (O13.Remote). In response thereto, the proxy service Sp' instantiates a virtual machine 330 (for example, by means of the Quick EMUlator, or QEMU) that emulates the mobile device 100. The proxy service Sp' then creates a clone of the app 310 from the corresponding image (referred to as cloned app 310'), which then comprises the same activities (denoted with A0', A1') and the same service (denoted with S0') (O14.Clone). In this way, the cloned app 310' may run on any operating system 305' (even if different from the operating system 305 of the mobile device 100), with the virtual machine 330 that acts as an insulation layer shielding the remote mobile device 100' from the cloned app 310'. At this point, the proxy service Sp' submits an explicit intent for the execution of the app action by the service S0', which is directly bound thereto by the operating system 305'. The service S0' is then activated to execute the app action (i.e., measuring the local atmospheric pressure and determining the weather forecast according to its change over time in the example at issue); the service S0' returns any result of the execution of the app action (i.e., the local atmospheric pressure and the weather forecast in the example at issue) to the proxy service Sp' (O15.Execute). In this way, the action executed by the remote mobile device 100' is based on a value that is measured in proximity of the mobile device 100. In this context, the term "in proximity" is to be intended with reference to the action that consumes the measured value. In other words, the remote mobile device 100' should measure a physical quantity (relating to its location) that is representative of the value thereof at the location of the mobile device 100 with an acceptable degree of accuracy (i.e., the local atmospheric pressure in the same Wi-Fi area or telecommunication cell). The proxy service Sp' in turn returns this result to the proxy service Sp (O16.Return).

In any case, as soon as the proxy service Sp receives the result of the execution of the app action from the service S0 (A12) or from the service S0' through the proxy service Sp' (A16), it returns it to the activity A0 (O17.Result). The running of the app 310 then continues normally. In this way, the fact that the app action has been executed locally or remotely is opaque to the app 310 (apart for a slight performance difference), which is then completely agnostic about the capability of the mobile device 100 to execute it.

In the above-described technique, the delegation of the execution of the action is implemented (by the delegation app 320) at the application level. Therefore, the desired result may be achieved without requiring neither any change (or at most minimal configuration changes) to the operating system 305 nor specific programming models. Indeed, the app 310 is unchanged, i.e., it is still written to run locally without forcing any specific re-modeling or instrumentation; moreover, the binding is managed as usual by the operating system 305, using its native/built-in mechanism (with at most the need of changing the distribution policies of the apps for allowing their installation even on mobile devices lacking their required features).

Figure 4:
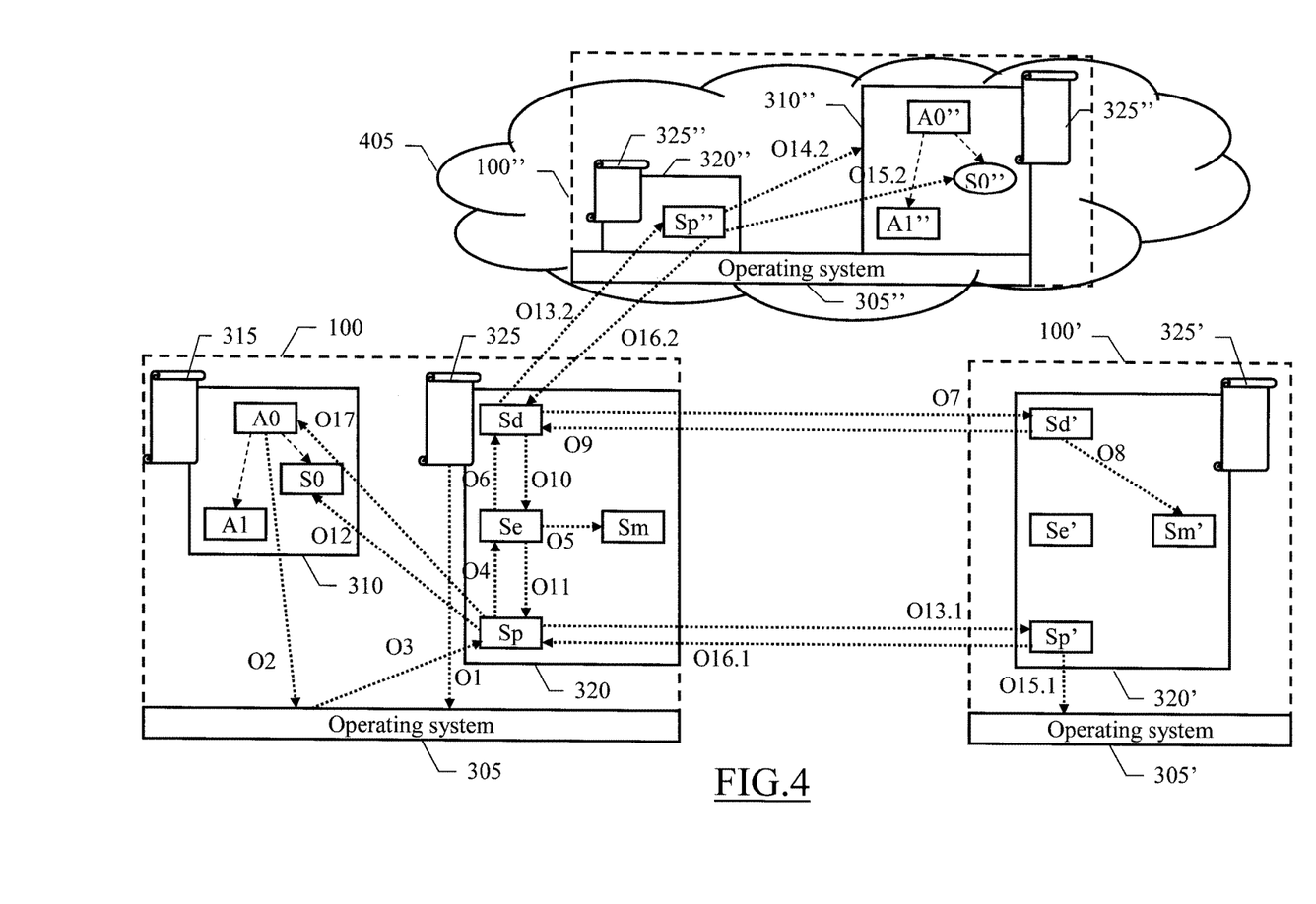
FIG. 4 shows a collaboration diagram representing the roles of the main software units that may be used to implement another exemplary scenario of an application embodiment according to one or more aspects of the present invention.

With reference now to FIG. 4, a collaboration diagram is shown representing the roles of the main software units that may be used to implement another exemplary scenario of application of an embodiment of the present disclosure.

This scenario differs from the one described above in that the remote mobile device 100' has been found that is only available to share the features required by the app intent (but not to execute it completely); a typical example is a sensor that is required by the intent app, but that it is not present on the mobile device 100. In this case, when the proxy service Sp receives the result of the evaluation of the app intent from the evaluation service Se (O11), it transmits an intent for causing the sharing of the sensor to the remote mobile device 100'; as above, the intent for causing the sharing of the sensor is explicit for the proxy service Sp', so that it is directly bound thereto by the operating system 305' (O13.1.Share). In response thereto, the proxy service Sp' activates the sensor (i.e., the barometer in the example at issue); the proxy service Sp' then returns the measured value of the corresponding physical quantity (i.e., the local atmospheric pressure in the example at issue) to the proxy service Sp' (O15.1.Sense). The proxy service Sp' in turn returns this measured value to the proxy service Sp (O16.1.Return).

At this point, the proxy service Sp transmits an intent for causing the execution of the app action to a cloud environment 405; this intent also comprises an image of the app 310 (or at least of the service S0) and the measured value. The cloud environment 405 offers computing resources on-demand as services (for example, on a pay-per-use basis); the cloud services are made available by cloud providers, which provision, configure and release the cloud resources upon request (so that they are generally of the virtual type with their actual implementation that is completely opaque to the users). In this specific case, the cloud environment 405 comprises a virtual machine that emulates the mobile device (hereinafter, referred to as virtual mobile device 100"); for this purpose, the virtual mobile device 100" has the same operating system (denoted with 305"), and a simplified delegation app (denoted with 320"), which only comprises a proxy service (denoted with Sp"), with its manifest file (denoted with 325"). The intent for causing the execution of the app action is explicit for the proxy service Sp", so that it is directly bound thereto by the operating system 305" (13.2.Virtual). The proxy service Sp' then creates a clone of the app 310 from the corresponding image (referred to as cloned app 310"), which then comprises the same activities (denoted with A0", A1") and the same service (denoted with S0") (14.2.Clone). At this point, the proxy service Sp" submits an explicit intent for the execution of the app action by the service S0", which is directly bound thereto by the operating system 305"; this intent also comprises the measured value that has been received. The service S0" is then activated to execute the app action; however, in this case the service S0" directly acts on the measured value without any need of sensing it (i.e., by determining the weather forecast according to the change of the measured local atmospheric pressure over time in the example at issue); the service S0" returns any result of the execution of the app action (i.e., the local atmospheric pressure and the weather forecast in the example at issue) to the proxy service Sp" (15.2.Execute). The proxy service Sp" in turn returns this result to the proxy service Sp (16.2.Return).

The flow of operation now proceeds as above, with the proxy service Sp that returns the result of the execution of the app action to the activity A0 (O17), with the running of the app 310 that then continues normally.

This allows the mobile device 100 to execute actions that would not be feasible, for example, because of their complexity; indeed, the cloud environment 405 provides the illusion of infinite computing resources. Therefore, this is particularly advantageous in case of high resource demanding actions (for example, image-recognition services). At the same time, these actions may be based on values that are measured in proximity of the mobile device 100 (by the remote mobile device 100').

Naturally, in order to satisfy local and specific requirements, a person skilled in the art may apply to the solution described above many logical and/or physical modifications and alterations. More specifically, although solutions have been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), and the term a/an should be intended as one or more items (unless expressly indicated otherwise).

For example, an embodiment provides a method for running a software application on a computing machine. The method comprises the following steps. A capability is registered of a delegation component to execute a set of one or more actions on the computing machine (each one defined by at least one characteristic thereof). A request is received for executing one of the actions from the software application by the delegation component; the request is bound to the delegation component at run-time according to the registration thereof. The execution of the action is delegated by the delegation component to at least one local component of the computing machine (being capable of executing at least part of the action) and/or to at least one remote component of at least one remote computing machine (being capable of executing at least part of the action) according to an availability of the at least one local component.

However, the software application may be of any type (for example, a widget displaying auto-updating contents), and it may run on any computing machine, even not of the mobile type (for example, a net-book). The delegation component may be of any type (for example, a broadcast receiver, a library, an application), and its capability may be registered in any way (see below). Each action may be defined by any number and type of characteristics (for example, with reference to a Uniform Resource Identifier, or URI). Each request may be bound to the delegation component in any way (for example, by intercepting it with hooking techniques, or even within the operating system). The execution of the action may be delegated to any number and type of local and/or remote components, according to any characteristic defining the availability of the local component (either intrinsic or temporary, for example, sensors presence, memory space, micro-processor type, operating system level, battery level, GPS coverage, Wi-Fi or 3G connection).

In an embodiment, delegating the execution of the action may include receiving a result of the execution of the action from the local component or the remote component, and returning the result to the software application.

However, the result of the action may be collected in any way (for example, in part from different local/remote components), and it may be of any type (down to a simple return code). In any case, the execution of the action may also have no result to be returned to the software application.

In an embodiment, delegating the execution of the action may include, when no local component is present on the computing machine, delegating the execution of the action to the remote component.

However, the decision of delegating the execution of the action remotely may also be conditioned to a manual approval by a user.

In an embodiment, delegating the execution of the action may include, when the local component is present on the computing machine, measuring at least one metric of the computing machine, and delegating the execution of the action to the local component or to the remote component according to said at least one metric.

However, the metrics may be in any number and of any type (for example, micro-processor usage, working memory occupation). The metrics may be measured in any way (for example, upon request or periodically). Moreover, the decision of delegating the execution of the action locally or remotely may be based on other policies (for example, according to a connection cost, a required quality of service). In any case, nothing prevents delegating the execution of the action always locally when it is possible.

In an embodiment, the action comprises an execution in the background of a service.

However, the action may be of any type (for example, from a simple operation to a whole application).

In an embodiment, the action comprises a sensing of a physical quantity.

However, the physical quantity may be of any type and it may be sensed by any number or type of sensors (for example, an accelerometer, a light sensor, a compass, a gyroscope, a proximity sensor).

In an embodiment, delegating the execution of the action may include delegating the sensing of the physical quantity to a first remote component of a first remote computing machine, receiving a measure of the physical quantity from the first remote component, and delegating the execution of the service to the local component or to a second remote component of a second remote computing machine by passing the measure of the physical quantity.

However, the action may require the sensing of any number of physical quantities on any number and type of remote computing machines (see below); the execution of the service may then be delegated to any number of local and/or remote components of any number and type of computing machines (see below), by passing any value based on the measure of the physical quantity (for example, the simple measure or a value calculated from one ore more measures).

In an embodiment, the computing machine is a mobile device; the first remote computing machine is another mobile device in proximity of the mobile device and the second remote computing machine is provided by a network service.

However, the other mobile device may be in any location-relationship with the mobile device (for example, within a blue-tooth coverage), and the network service may be of any type (for example, a web service). In any case, the computing machine, the first remote computing machine and the second computing machine may be of any other type.

In an embodiment, delegating the execution of the action may include discovering an availability of each remote computing machine, in proximity of the computing machine, to execute at least part of the action.

The availability of the remote computing machines may be discovered in any way (for example, upon request for a specific action or by collecting it for every action periodically and extracting the one for a specific action from the collected information upon request). Moreover, the availability of each remote computing machine may be decided in any way (for example, according to a load condition or to a manual approval by a user); in any case, some remote computing machines may be always available (for example, when implementing public utilities). The remote computing machines to be discovered may be selected in any way (even indiscriminately).

In an embodiment, delegating the execution of the action may include delegating the execution of the action to a virtual computing machine emulating the computing machine.

However, the virtual machine may be instantiated in any way (either upon request or in advance and maintained synchronized with the computing machine). In any case, the action may be executed directly on the remote computing machine (without any virtualization layer).

In an embodiment, delegating the execution of the action may include causing the remote computing machine to clone the software application from an image thereof.

However, the cloning may relate to the local component only or to the whole software application. In any case, nothing prevents downloading (from any location) and installing the required components or the whole software application temporarily on the remote computing machine (assuming their operating systems are compatible).

In an embodiment, registering a capability of a delegation component may include providing the delegation component with a manifest file with an intent filter for each one of the actions indicating the capability of the delegation component to execute the action.

However, the manifest file may have any format and it may be replaced by any other storage structure (for example, a database). In any case, nothing prevents registering the capability of the delegation component in any other way (for example, by specific instructions that are executed at its installation).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment provides a computer program for causing a computing machine to perform the steps of the above-mentioned method when the computer program is executed on the computing machine.

A further embodiment provides a computer program product comprising a non-transitory computer readable medium embodying a computer program, the computer program comprising code directly loadable into a working memory of a computing machine thereby configuring the computing machine to perform the same method.

However, the above-described solution may be implemented as a stand-alone software application, as a plug-in for an operating system or even directly in the operating system itself. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A further embodiment provides a system comprising means for performing the steps of the above-described method.

However, this method may also be carried out on a system based on a different architecture (for example, a local, wide area, global, cellular or satellite network), and exploiting any type of (wired and/or wireless) connections.

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The invention claimed is:

1. A computer-implemented method for running a software application on a local mobile device, the computer-implemented method comprising:
    registering a capability of a delegation component to execute at least one action on the local mobile device, each action of the at least one action being defined by at least one characteristic thereof;
    executing the software application on the local mobile device, the executing comprising:
        receiving a request for executing the at least one action from the software application by the delegation component, the request being bound to the delegation component at run-time according to the capability registration thereof;
        delegating, by the delegation component, the execution of the at least one action to at least one local component of the local mobile device capable of executing at least part of the at least one action and/or to at least one remote component of at least one remote mobile device capable of executing at least part of the at least one action according to an availability of the at least one local component, the delegating including determining availability of the at least one remote mobile device to assist with the executing of the at least part of the at least one action; and
    wherein:
        the at least one action comprises an execution of a service;
        the at least one action comprises a sensing of a physical quantity;
        delegating the execution of the at least one action comprises:
            delegating the sensing of the physical quantity to a first remote component of one remote mobile device of the at least one remote mobile device;
            receiving a measure of the physical quantity from the first remote component;
            delegating the execution of the service to the local component or to a second remote component of a remote computing machine by passing a value based on the measure of the physical quantity; and
        the remote computing machine is provided by a network service.

2. The computer-implemented method of claim 1, wherein delegating the execution of the at least one action comprises:
    receiving a result of the execution of the at least one action from the at least one local component or the at least one remote component; and
    returning the result to the software application.

3. The computer-implemented method of claim 1, wherein delegating the execution of the at least one action comprises, when no local component is present on the local mobile device:
  delegating the execution of the at least one action to the at least one remote mobile device.

4. The computer-implemented method of claim 1, wherein delegating the execution of the at least one action comprises, when the at least one local component is present on the local mobile device:
  measuring at least one metric of the local mobile device; and
  delegating the execution of the at least one action to the at least one local component or to the at least one remote component according to the at least one metric.

5. The computer-implemented method claim 1, wherein delegating the execution of the at least one action comprises:
  determining an availability of each remote mobile device of the at least one remote mobile device, in proximity of the local mobile device, to execute at least part of the at least one action.

6. The computer-implemented method of claim 1, wherein the registering the capability of the delegation component comprises:
  providing the delegation component with a manifest file with an intent filter for the at least one action indicating the capability of the delegation component to execute the at least one action.

7. A computer program product for running a software application on a local mobile device, the computer program product comprising:
  a non-transitory computer-readable storage medium having program instructions embodied therewith, the program instructions being executable by a processor to cause the processor to perform a method comprising:
    registering a capability of a delegation component to execute at least one action on the local mobile device, each action of the at least one action being defined by at least one characteristic thereof;
    executing the software application on the local mobile device, the executing comprising:
      receiving a request for executing the at least one action from the software application by the delegation component, the request being bound to the delegation component at run-time according to the capability registration thereof; and
      delegating, by the delegation component, the execution of the at least one action to at least one local component of the local mobile device capable of executing at least part of the at least one action and/or to at least one remote component of at least one remote mobile device capable of executing at least part of the at least one action according to an availability of the at least one local component, the delegating including determining availability of the at least one remote mobile device to assist with the executing of the at least part of the at least one action; and
    wherein:
      the at least one action comprises an execution of a service;
      the at least one action comprises a sensing of a physical quantity;
      delegating the execution of the at least one action comprises:
        delegating the sensing of the physical quantity to a first remote component of one remote mobile device of the at least one remote mobile device;
        receiving a measure of the physical quantity from the first remote component;
        delegating the execution of the service to the local component or to a second remote component of a remote computing machine by passing a value based on the measure of the physical quantity; and
      the remote computing machine is provided by a network service.

8. The computer program product of claim 7, wherein delegating the execution of the at least one action comprises:
  receiving a result of the execution of the at least one action from the at least one local component or the at least one remote component; and
  returning the result to the software application.

9. The computer program product of claim 7, wherein delegating the execution of the at least one action comprises, when no local component is present on the local mobile device:
  delegating the execution of the at least one action to the at least one remote mobile device.

10. The computer program product of claim 7, wherein delegating the execution of the at least one action comprises, when the at least one local component is present on the local mobile device:
  measuring at least one metric of the local mobile device; and
  delegating the execution of the at least one action to the at least one local component or to the at least one remote component according to the at least one metric.

11. The computer program product of claim 7, wherein the at least one action comprises an execution of a service.

12. A system for running a software application on a local mobile device, the system comprising:
  a memory; and
  a processor communicatively coupled to the memory, wherein the system performs a method comprising:
    registering a capability of a delegation component to execute at least one action on the local mobile device, each action of the at least one action being defined by at least one characteristic thereof;
    executing the software application on the local mobile device, the executing comprising:
      receiving a request for executing the at least one action from the software application by the delegation component, the request being bound to the delegation component at run-time according to the capability registration thereof;
      delegating, by the delegation component, the execution of the at least one action to at least one local component of the local mobile device capable of executing at least part of the at least one action and/or to at least one remote component of at least one remote mobile device capable of executing at least part of the at least one action according to an availability of the at least one local component, the delegating including determining availability of the at least one remote mobile device to assist with the executing of the at least part of the at least one action; and
    wherein:
      the at least one action comprises an execution of a service;

the at least one action comprises a sensing of a physical quantity;

delegating the execution of the at least one action comprises:

delegating the sensing of the physical quantity to a first remote component of one remote mobile device of the at least one remote mobile device;

receiving a measure of the physical quantity from the first remote component;

delegating the execution of the service to the local component or to a second remote component of a remote computing machine by passing a value based on the measure of the physical quantity; and the remote computing machine is provided by a network service.

13. The system of claim 12, wherein delegating the execution of the at least one action comprises:

receiving a result of the execution of the at least one action from the at least one local component or the at least one remote component; and returning the result to the software application.

14. The system of claim 12, wherein delegating the execution of the at least one action comprises, when no local component is present on the local mobile device:

delegating the execution of the at least one action to the at least one remote component.

* * * * *